(12) United States Patent
Hariharan et al.

(10) Patent No.: US 6,721,698 B1
(45) Date of Patent: Apr. 13, 2004

(54) SPEECH RECOGNITION FROM OVERLAPPING FREQUENCY BANDS WITH OUTPUT DATA REDUCTION

(75) Inventors: Ramalingam Hariharan, Tampere (FI); Juha Häkkinen, Tampere (FI); Imre Kiss, Tampere (FI); Jilei Tian, Tampere (FI); Olli Viikki, Tampere (FI)

(73) Assignee: Nokia Mobile Phones, Ltd., Espoo (FI)

( * ) Notice: Subject to any disclaimer, the term of this patent is extended or adjusted under 35 U.S.C. 154(b) by 286 days.

(21) Appl. No.: 09/698,773

(22) Filed: Oct. 27, 2000

(30) Foreign Application Priority Data

Oct. 29, 1999 (FI) ............................................. 19992350

(51) Int. Cl.$^7$ .................... G10L 19/02; G10L 15/02; G10L 15/08
(52) U.S. Cl. ..................... 704/203; 704/231; 704/236; 704/251
(58) Field of Search ............................. 704/203, 251, 704/236, 231

(56) References Cited

U.S. PATENT DOCUMENTS

| | | |
|---|---|---|
| 5,732,190 A | 3/1998 | Hamasaki et al. .......... 395/2.42 |
| 6,292,776 B1 * | 9/2001 | Chengalvarayan .......... 704/219 |
| 6,370,504 B1 * | 4/2002 | Zick et al. .................. 704/251 |

FOREIGN PATENT DOCUMENTS

| | | |
|---|---|---|
| WO | WO 94/22132 | 9/1994 |
| WO | WO 95/17746 | 6/1995 |

OTHER PUBLICATIONS

"Quantization of Cepstral Parameters for Speech Recognition over the World Wide Web", Digalakis et al., 1999, IEEE Journal on Selected Areas in Communications, vol. 17, No. 1, pp. 82–90.

"Sub–Band Based Recognition of Noisy Speech", Tibrewala et al., 1997, Acoustics, Speech, and Signal Processing, vol. 2, pp. 1255–1258.

"Subband–Based Speech Recognition", Bourland et al., 1997, Acoustics, Speech, and Signal Processing, pp. 1251–1254.

"Speech Processing, Transmission And Quality Aspects (STQ); Distributed Speech Recognition; Front–end Feature Extraction Algorithm; Compression Algorithm", ETSI ES 201 108, VO.0.8.

"Multi–Band Speech Recognition In Noisy Environments", Okawa et al., IEEE, 1998, pp. 641–644.

"Multirate Digital Signal Processing", pp. 491–534.

* cited by examiner

Primary Examiner—Vijay Chawan
Assistant Examiner—V. Paul Harper
(74) Attorney, Agent, or Firm—Perman & Green, LLP (57) ABSTRACT

A speech recognition feature extractor includes
  a time-to-frequency domain transformer for generating spectral values in the frequency domain from a speech signal;
  a partitioning means for generating a first set and an additional set of spectral values in the frequency domain;
  a first feature generator for generating a first group of speech features using the first set of spectral values;
  a additional feature generator for generating an additional group of speech features using the additional set of spectral values; the feature generators arranged to operate in parallel,
  an assembler for assembling an output set of speech features from at least one speech feature from the first group of speech features and at least one speech feature from the additional group of speech features, and an anti-aliasing and sampling rate reduction block, where the first and the additional set of spectral values comprise at least one common spectral value.

20 Claims, 5 Drawing Sheets

SPEECH RECOGNITION FROM OVERLAPPING FREQUENCY BANDS WITH OUTPUT DATA REDUCTION

FIELD OF THE INVENTION

This invention relates to speech recognition.

BACKGROUND OF THE INVENTION

Speech recognition is well known in the field of computers. Nowadays it is being applied to mobile telephones and particularly to enable voice dialling functionality. With voice dialling, a user can, for example, say the name of a person whom he or she wants to call to, the telephone recognises the name and then looks up a corresponding number. Alternatively, the user may directly say the telephone number he requires. This is convenient, since the user does not have to use keys. It is desirable to increase the ability of mobile telephones to understand spoken words, letters, numerals and other spoken information to a greater extent. Unfortunately, current speech recognition techniques require too much processing capacity to be practically used in a small portable mobile telephone.

Speech recognition functionality can be implemented in a telephone network, in such a way that a telephone user's speech is recognised in the network rather than in a handset. By locating speech recognition functionality in the network, greater processing power can be made available. However, the accuracy of speech recognition is degraded by distortions introduced into the speech signal and by the reduction in bandwidth that results from its transmission to the network, In a typical landline connection, the bandwidth of the speech signal transferred to the network is only about 3 kHz, which means that a significant part of the voice spectrum is lost and thus the information it contains is unavailable for use in speech recognition. This problem can be avoided by dividing speech recognition functionality between the telephone handset and the network.

WO 95/17746 describes a system in which an initial stage of speech recognition is carried out in a remote station. The remote station generates parameters characteristic of the voice signal, so-called "speech features" and transmits them to a central processing station which is provided with the functionality to process the features further. In this way, the features can be extracted e.g. from a speech signal using the entire spectrum captured by a microphone of the remote station. Additionally, the required transmission bandwidth between the remote station and the central processing station is also reduced. Instead of transmitting a speech signal to convey the speech in electrical format, only a limited number (e.g. tens) of parameters (features) are transmitted for each speech frame.

The two main blocks typically present in speech recognition systems are a signal processing front-end, where feature extraction is performed, and a back-end, where pattern matching is performed to recognise spoken information. It is worth mentioning, that division of speech recognition into these two parts, front-end and back-end, is also feasible in cases other than a distributed speech recognition system. The task of the signal processing front-end is to convert a real-time speech signal into some kind of parametric representation in such a way that the most important information is extracted from the speech signal. The back-end is typically based on a Hidden Markov Model (HMM) that adapts to a speaker so that the probable words or phonemes are recognised from a set of parameters corresponding to distinct states of speech. The speech features provide these parameters. The objective is that the extracted feature vectors are robust to distortions caused by background noise, a communications channel, or audio equipment (for example, that used to capture the speech signal).

Prior art systems often derive speech features using a front-end algorithm based on Mel-Frequency Cepstral Coefficients (MFCCs). MFCCs provide good accuracy in situations where there is little or no background noise, but performance drops significantly in the presence of only moderate levels of noise. Thus, there is a need for a method that has a corresponding performance at low levels of background noise and significantly better performance in noisier conditions.

The noise which disturbs the speech recognition process originates from various sources. Many of these noise sources are so-called convolutional noise sources. In other words, the effect they have on the speech signal can be represented as a mathematical convolution between the noise source and the speech signal. The vocal tract of the user and the electrical components used in speech acquisition and processing can both be considered as convolutional noise sources. The user's vocal tract has an acoustic transfer function determined by its physical configuration and the electrical components of the acquisition and processing system have certain electronic transfer functions. The transfer function of the user's vocal tract affects, among other things, the pitch of the spoken information uttered by the user, as well as its general frequency characteristics. The transfer functions of the electrical components, which usually include a microphone, an amplifier(s) and an Analogue-to-Digital (AID) converter, for converting the signal captured by the microphone into digital form, affect the frequency content of the captured speech information. Thus, both the user-specific transfer function of the vocal tract and the device-specific electronic transfer function(s) effectively cause inter-user and inter-device variability in the properties of the speech information acquired for speech recognition. The provision of a speech recognition system that is substantially immune to these kinds of variations is a demanding technical task.

Figure 1:
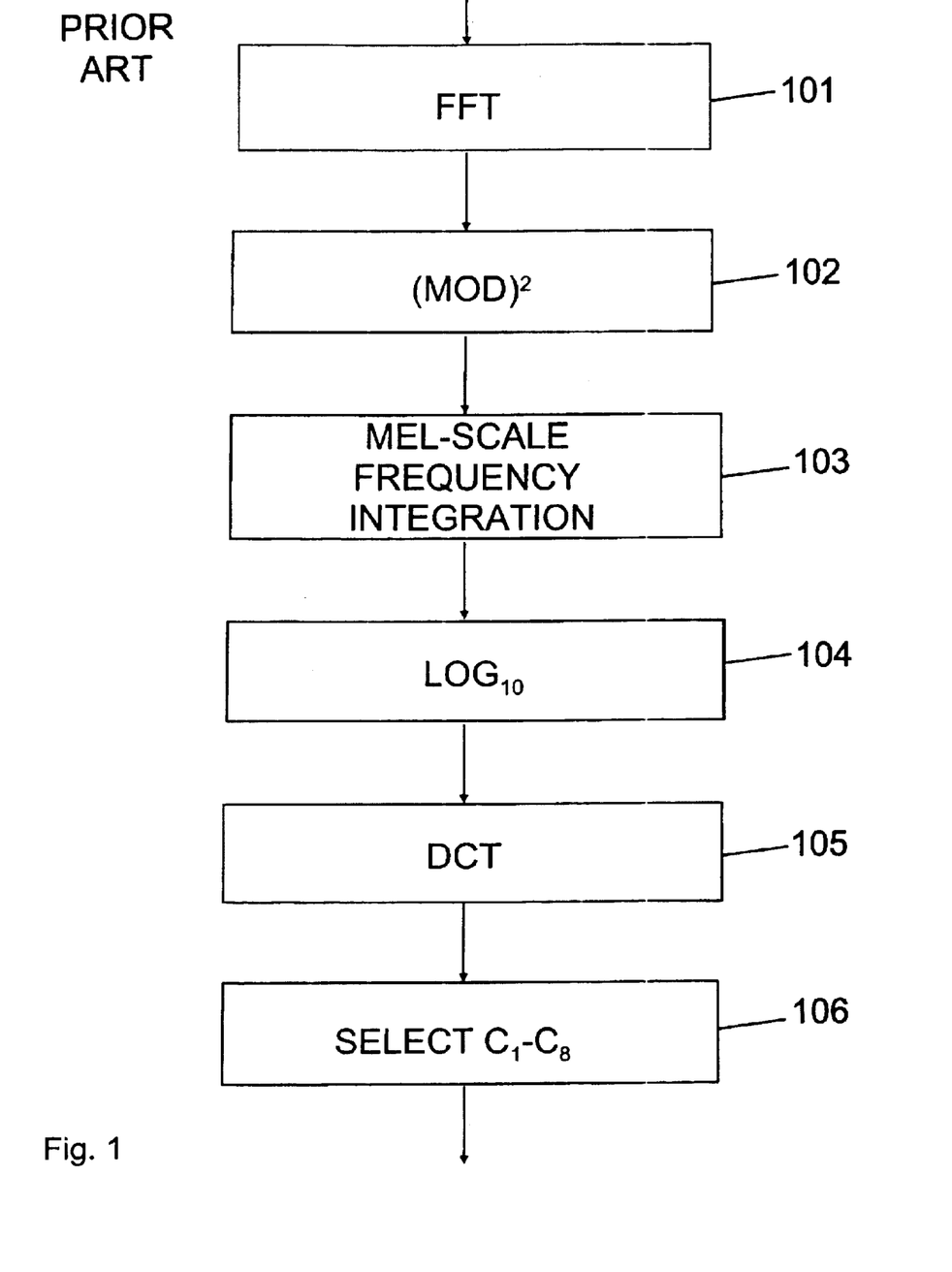
FIG. 1 shows a functional block diagram of an MFCC generator according to WO94/22132.

Speech recognition of a captured speech signal typically begins with A/D-conversion, pre-emphasis and segmentation of a time-domain electrical speech signal. At the pre-emphasis stage, the amplitude of the speech signal is enhanced in certain frequency ranges, usually those in which the amplitude is smaller. Segmentation segments the signal into frames representing a short time period, usually 20 to 30 milliseconds. The frames are formed in such a way that they are either temporally overlapping or non-overlapping. Speech features are generated using these frames, often in the form of Mel-Frequency Cepstral Coefficients (MFCCs). It should be noted that although much of the description which follows concentrates on the use of Mel-Frequency Cepstral Coefficients in the derivation of speech features, application of the invention is not limited to systems in which MFCCs are used. Other parameters may also be used as speech features. WO 94/122132 describes the generation of MFCCs. The operation of an MFCC generator described in that publication is shown in FIG. 1. A segmented speech signal is received by a time-to-frequency-domain conversion unit. In step 101, a speech frame is transformed into the frequency domain with a Fast Fourier Transform (FFT) algorithm to provide 256 transform coefficients. In step 102, a power spectrum of 128 coefficients is formed from the transform coefficients. In step 103, the power spectrum is integrated over 19 frequency bands to provide 19 band power coefficients. In step 104, a logarithm is computed from each of the 19 band power coefficients to provide 19 log-values. In step 105, a Discrete Cosine Transform (DCT) is performed on the 19 log-values. The frequency domain signal is then processed in a noise reduction block in order to suppress noise in the signal. Finally, the 8 lowest order coefficients are selected.

It should be appreciated, that the numbers of samples and various coefficients referred to in WO 94/22132 represent only one example.

It is a characteristic of linear transforms, for example DCTs, that disturbance caused by noise in a certain frequency band is spread to surrounding frequency bands. This is an undesirable effect, particularly in speech recognition applications.

In Okawa et al., "Multiband Speech Recognition In Noisy Environments," IEEE, 1998, pp. 641–644 (IEEE 0-7803-4428-6/98) a multi-band automatic speech recognition method is presented. In this method a speech signal is divided into different sub-parts of the entire frequency band of the signal. Then each sub-part is processed separately. In this case, narrow-band noise occurring in one frequency sub-part does not spread from one sub-part to another frequency sub-part. The method has shown good results in the case where the majority of the frequency band is not affected by noise, for example, in the presence of narrow band noise. However, when the noise is spread widely over the frequency band of the speech signal, word recognition accuracy can drop by up to 25%. The method is thus appropriate only under certain types of noise, for example to compensate for car engine noise that appears only in a relatively narrow frequency band.

SUMMARY OF THE INVENTION

It is an object of the present invention to improve speech recognition accuracy for various noise types and under different noise conditions.

According to a first aspect of the disclosed embodiments a speech recognition feature extractor includes a time-to-frequency domain transformer for generating spectral values in the frequency domain from a speech signal, and a partitioning block for generating a first set of spectral values in the frequency domain and an additional set of spectral values in the frequency domain. The first aspect also includes a first feature generator for generating a first group of speech features using the first set of spectral values and an additional feature generator for generating an additional group of speech features using the additional set of spectral values. The feature generators are arranged to operate in parallel.

An assembler is included for assembling an output set of speech features from at least one speech feature from the first group of speech features and at least one speech feature from the additional group of speech features, and an anti-aliasing and rate reduction block, configured to convert the output set of speech features to a data reduced output set. Furthermore, the first and additional set of spectral values include at least one common spectral value.

According to a second aspect of the disclosed embodiments a speech recognition system includes a speech recognition feature extractor and a back-end for recognising spoken information from speech features.

The feature extractor includes a time-to-frequency domain transformer for generating spectral values in the frequency domain from a speech signal, a partitioning block for generating a first set of spectral values in the frequency domain and an additional set of spectral values in the frequency domain, a first feature generator for generating a first group of speech features using the first set of spectral values, and an additional feature generator for generating an additional group of speech features using the additional set of spectral values. The feature generators are arranged to operate in parallel, and the first and additional set of spectral values include at least one common spectral value.

The feature extractor also includes an assembler for assembling an output set of speech features from at least one speech feature from the first group of speech features and at least one speech feature from the additional group of speech features and an anti-aliasing and rate reduction block, configured to convert the output set of speech features to a data reduced output set.

The back-end includes a data bank for maintaining statistical models of spoken information, a block for receiving speech features relating to two different frequency ranges of a speech frame, and a recognition block for selecting from the data bank, a model of spoken information that best matches received speech features.

The various aspects of the disclosed embodiments may be implemented in a number of apparatus' and methods and may also be embodied in a computer program product that includes computer readable program code.

The spoken information may be a word and statistical models of words may be maintained. Alternatively, the spoken information may be a phoneme and statistical models of phonemes may be maintained. In yet another embodiment, the spoken information may be an utterance and statistical models of utterances may be maintained.

The statistical models of spoken information, referred to above, may be maintained in a data bank.

It should be appreciated that the inventive concept enabling the embodiments of the first aspect also applies to the other aspects, but in order to condense this document all these numerous embodiments are not expressly written out.

BRIEF DESCRIPTION OF THE DRAWINGS

The invention will now be described, by way of example only, with reference to the accompanying drawings, in which.

DETAILED DESCRIPTION

FIG. 1, showing a functional block diagram of an MFCC generator according to WO94/22132, has already been described in the foregoing.

Figure 2:
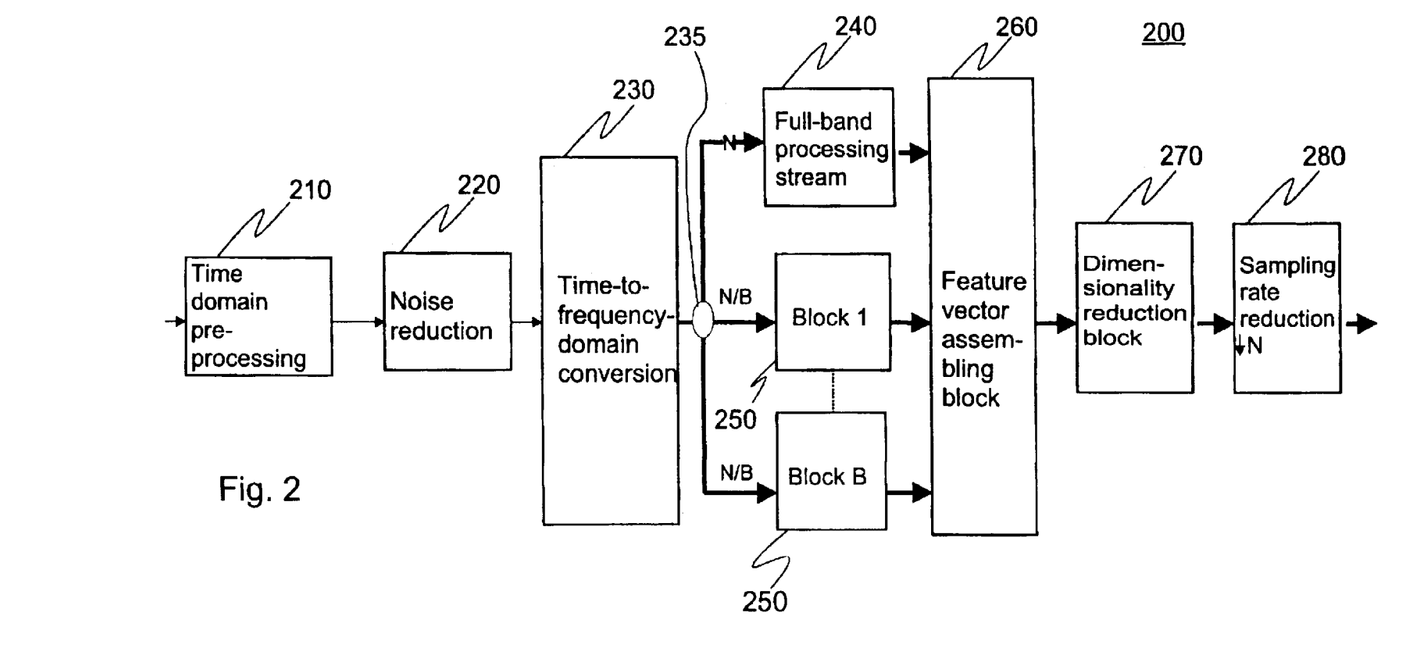
FIG. 2 shows a functional block diagram of a speech recognition front-end according to a preferred embodiment of invention.

FIG. 2 shows a functional block diagram of a speech recognition front-end 200, or feature extractor, for extracting speech features according to a preferred embodiment of the invention. The front-end comprises a time domain pre-processing block 210 for receiving an input signal, a noise reduction block 220, a time-to-frequency domain conversion block 230, a partitioning block 235, a full-band processing block 240, a set of sub-part processing blocks 250 in parallel with the full-band processing block 240, a feature vector assembling block 260, a dimensionality reduction block 270 and a sampling rate reduction block 280 producing an output signal.

The front-end extracts speech features to be used in speech recognition. The speech recognition takes place in a back-end. The operation of the back-end is described later.

The operation of the front end is now explained with reference to FIGS. 2 and 3. The time domain pre-processing block 210 converts a speech signal into a digital signal with a sampling rate of 8 kHz. The digital signal is segmented into frames each having N samples. In this preferred embodiment of the invention the number of samples in each frame is initially set to 200 and the frame length is 25 ms. The frames may be formed in a partially overlapping or a non-overlapping manner. The noise reduction block 220 receives the frames and suppresses the noise in each frame, thus generating noise suppressed frames containing 200 noise suppressed samples.

Time-to-frequency domain conversion block 230 receives the noise suppressed samples and computes a frequency spectrum. This is accomplished by generating a number of spectral values representing the frequency content of the frame. In the preferred embodiment of the invention the spectral values are spectral magnitude values and the spectrum is calculated using a Fast Fourier Transform (FFT). In order to enhance the efficiency of the FFT, the number of samples in each frame is increased from 200 to 256 using the technique of zero padding, in which additional samples having the value zero are added to the frame. For general frames, with numbers of samples other than 200, the number of samples can be increased in a similar way to the next higher power of 2. The overall effect of doing this is a significant increase in the speed at which the FFT computation is accomplished. The result, in the preferred embodiment of the invention is a set of 256 coefficients, or spectral values. Block 235 is a partitioning block. The operation of the partitioning block is two-fold. Firstly, it provides the entire spectrum of 256 coefficients, that is spectral magnitude values, to full-band processing block 240. Additionally, it produces a set of sub-parts by applying band-pass filters, each of the sub-parts comprising a sub-set of the spectral magnitude values of the entire spectrum.

The full-band processing block 240 receives the spectral magnitude values of the entire spectrum and the set of sub-part processing blocks 250 receive spectral magnitude values contained by the sub-parts. Both the full-band processing block 240 and the set of sub-part processing blocks 250 compute sets of MFCCs, which are further collected by the feature vector assembling block 260. In this embodiment, there are four sub-part processing blocks, each receiving a different frequency range of the spectral magnitude values. The entire range of spectral magnitude values corresponds to a frequency band of 0 to 4 kHz. The band-pass filters in block 235 have cut-off frequencies of 0 to 0.9 kHz, 0.9 kHz to 1.8 kHz, 1.8 kHz to 2.8 kHz and 2.8 kHz to 4 kHz. The sub-part processing blocks receive spectral magnitude values corresponding to these frequency bands. It should be noted that the full frequency band does not need to be divided equally between the sub-parts. Furthermore, the sub-part frequency bands may overlap. Such variations may be provided in alternative embodiments of the invention. In a further alternative embodiment, the sub-parts are constructed in such a way that together they do not cover the entire spectrum of spectral magnitude values.

It is important to notice that each sub-part processes a part of the full frequency band spectral magnitude values. The sub-parts are derived from portions of the entire frequency band of the original speech spectrum. Therefore, noise in frequency bands surrounding a particular sub-part does not affect that part. Each processing block produces a set of MFCCs corresponding to the particular frequency band received by the block.

In an alternative embodiment of the invention, there is no full-band processing block but the desired frequency band, over which speech recognition is to occur, is covered totally or partially by sub-parts. In other embodiments the number of sub-parts is other than 4. In the preferred embodiment, the full band is covered both by a full-band part and additionally sub-parts that also cover the entire bandwidth.

The feature vector assembling block 260 forms sets of MFCCs into a feature vector. The feature vector is preferably constructed by selecting speech features produced by the full-band processing part and the sub-part processing blocks.

Although the feature vector can then be transmitted as such to a Back-End for speech recognition, it is preferable to reduce the amount of data to be transmitted. The dimensionality reduction block 270 and the sampling rate reduction block 280 are provided for this purpose. The dimensionality reduction block 270 receives the feature vector for reducing the dimensionality of the output set. In this example, the dimensionality reduction block takes the form of an anti-aliasing filter which compresses speech features to form compressed speech features. The sampling-rate reduction block 280 further reduces the sampling rate by down sampling the compressed speech features to a set of down sampled speech features.

Figure 3:
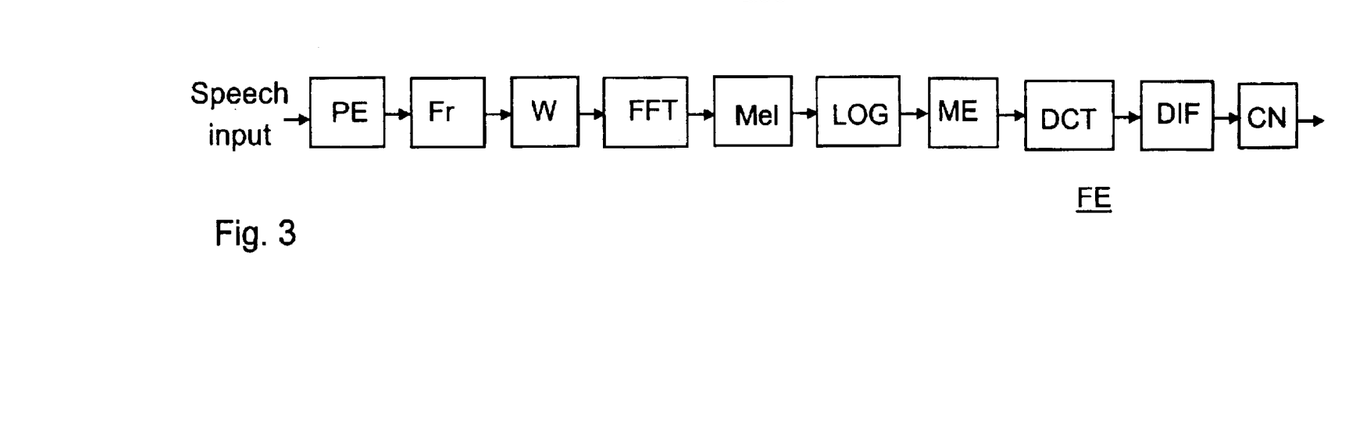
FIG. 3 shows a functional block diagram of a speech recognition front-end full-band operation according to one embodiment of the invention.

FIG. 3 shows a functional block diagram of a speech recognition front-end according to one embodiment of the invention, illustrating its operation in connection with the processing of the full-band part. The same operating principle can be used to process the sub-parts of the magnitude values, when just a sub-part of frequency spectrum magnitude values is employed.

The block diagram starts from a point where a speech signal is digitised (not shown). The blocks of the block diagram are, in sequential order:

| | |
|---|---|
| PE | pre-emphasising the speech signal, |
| Fr | framing the signal into (overlapping) frames, |
| W | windowing, that is multiplication by a window function, |
| FFT | time-to-frequency domain transformation to produce frequency domain spectral magnitude values, |
| Mel | filtering of frequency domain spectral magnitude values to produce sub-band values according to an auditory based scale, the sub-band values describing energies at certain frequency sub-bands of the auditory based frequency scale, |
| LOG | compression of sub-band values, |
| ME | mean emphasising of sub-band values, |
| DCT | de-correlating of sub-band values, |
| CN | normalisation of sub-band values. |

In an alternative embodiment the order of the LOG and ME blocks is reversed, such that mean emphasis is applied to sub-band values before hey are compressed.

In further alternative embodiments, mean emphasis is not used.

In an embodiment of the invention, the front-end comprises an offset compensation block between the pre-emphasis block and the windowing block. The offset compensation block removes any DC offset from the digitised speech input signal $S_{in}$ producing a substantially offset-free input signal $s_{of}$. This is carried out according to the equation:

$$s_{of}(n) = s_{in}(n) - s_{in}(n-1) + 0.999 \cdot s_{of}(n-1) \quad (1)$$

The substantially offset-free input signal $s_{of}$ is segmented into overlapping frames of N samples. The difference (shift interval) between the starting points of consecutive frames is M samples. The parameter M defines the number of frames per unit time.

The specific values of N and M depend on the chosen sampling rate as shown in Table I. The frame length is 25 ms for 8 and 16 kHz sampling rates, and 23.27 ms for a sampling rate of 11 kHz.

TABLE I

Values of frame length N and frame shift interval M according to different sampling rates.

| Sampling rate (kHz) | $f_{s3}=16$ | $f_{s2}=11$ | $f_{s1}=8$ |
|---|---|---|---|
| Frame length N (samples) | 400 | 256 | 200 |
| Shift interval M (samples) | 160 | 110 | 80 |

The framed offset-free input signal is pre-emphasised in the pre-emphasis block PE by applying the relationship:

$$s_{pe}(n) = s_{of}(n) - 0.97 \cdot s_{of}(n-1) \quad (2)$$

where $s_{of}$ and $s_{pe}$ are the input and output of the pre-emphasis block, respectively.

The output of the pre-emphasis block is windowed by a Hamming window of length N, defined as follows:

$$s_w(n) = \left\{ 0.54 - 0.46 \cdot \cos\left(\frac{2\pi(n-1)}{N-1}\right) \right\} \cdot s_{pe}(n), \; 1 \leq n \leq N \quad (3)$$

where N is the frame length and $s_{pe}$ and $s_w$ are the input and output of the windowing block W, respectively.

Each frame of N samples is zero padded to form an extended frame of 256 samples for the 8 and 11 kHz sampling rates, and 512 samples if the sampling rate is 16 kHz. In the FFT block, a Fast Fourier transform of length 256 or 512, respectively, is applied to compute the magnitude spectrum of the signal:

$$bin_k = \left| \sum_{n=0}^{FFTL-1} s_w(n) e^{jnk\frac{2\pi}{FFTL}} \right|, \; k = 0, \ldots, FFTL-1, \quad (4)$$

where $s_w(n)$ is the input to the FFT block, FFTL is the length of the FFT block (256 or 512 samples), and $bin_k$ is the absolute value of the resulting complex vector for frequency bin k. Due to symmetry, only bins $bin_0$ to $bin_{FFTL/2}$ are required and thus used for further processing.

After the FFT block a Mel-filter is used to generate the sub-band values. The Mel-filter receives sets of magnitude values corresponding to Mel-scale frequency sub-bands (channels). Then each frequency sub-band value is calculated from the corresponding magnitude values.

The low-frequency components of the magnitude spectrum are ignored to avoid low-frequency noise. In a preferred embodiment of the invention, the useful frequency band is chosen to lie between 64 Hz and half of the actual sampling frequency. The useful frequency band is divided into 23 channels equidistant in the Mel frequency domain. Each of the channels has a triangular-shaped frequency window and the consecutive channels are half-overlapping.

The choice of the starting frequency of the filter bank, $f_{start}=64$ Hz, roughly corresponds to the case where the full frequency band is divided into 24 channels (sub-bands) and the first channel is discarded.

The centre frequencies of the channels in terms of FFT bin indices are calculated according to the following equations:

$$Mel\{x\} = 2595 \cdot \log_{10}\left(1 + \frac{x}{700}\right) \quad (5a)$$

$$f_{c_i} = Mel^{-1}\left\{ Mel\{f_{start}\} + \frac{Mel\{f_s/2\} - Mel\{f_{start}\}}{23+1} i \right\}, \; i = 1 \ldots, 23, \quad (5b)$$

$$cbin_i = round\left\{ \frac{f_{c_i}}{f_s} FFTL \right\}, \quad (5c)$$

where round(.) indicates rounding towards the nearest integer and $cbin_i$ is the ith FFT index.

A weighted sum of the FFT spectral magnitude values ($bin_i$) in each sub-band, that is the sub-band value for a given sub-band, is computed as an output of the Mel filter. Half-overlapped triangular windowing is used, $$fbank_k = \sum_{i=cbin_{k-1}}^{cbin_k} \frac{i - cbin_{k-1} + 1}{cbin_k - cbin_{k-1} + 1} bin_i + \sum_{i=cbin_k+1}^{cbin_{k+1}} \left(1 - \frac{i - cbin_k}{cbin_{k+1} - cbin_k + 1}\right) bin_i, \quad (6)$$

where k=1, . . . ,23, $cbin_0$ and $cbin_{24}$ denote the FFT bin indices corresponding to the starting frequency and half of the sampling frequency:

$$cbin_0 = round\left\{ \frac{f_{start}}{f_s} FFTL \right\}, \quad (7a)$$

$$cbin_{24} = round\left\{ \frac{f_s/2}{f_s} FFTL \right\} = FFTL/2. \quad (7b)$$

In the preferred embodiment, two first channels are discarded, not just the first one.

In the compression block LOG, a non-linear transformation is performed on the output of the Mel filtering block by applying a natural logarithm function:

$$f_i = \ln(fbank_i), \; i=1, \ldots, 23 \quad (8)$$

According to an alternative embodiment, a logarithm function with another base (for example, 10, 16, 2) is used instead of the natural logarithm function.

After the non-linear transformation, mean emphasising is applied to the output of the non-linear transformation block:

$$f'_i = f_i + m_i, \; i=1, \ldots, 23 \quad (9)$$

where $m_j$ is a mean estimate term characterising mean of previous values of $f_j$.

The mean estimate term $m_j$ is calculated from a mean estimate $\bar{m}_i$:

$$m_i = c \cdot \bar{m}_i \quad (10),$$

where c is a weighting factor defining how large an influence mean emphasis has on the sub-band values. The choice of weighting factor depends on the exact implementation of the invention. For example, c may take the value 0.5 or 1.

The mean estimate $\overline{m}_i$ is calculated from previous sub-band values of $f_j$ according to the relationship:

$$\overline{m}_i(k) = A \cdot \overline{m}_i(k-1) + (1-A) \cdot f_i(k), \; i=1,\ldots,23, k=1, \quad (11)$$

where k is a speech frame index and A is a so-called "forgetting-factor".

In this embodiment, the forgetting-factor A is 0,975. The higher the forgetting-factor, the smaller is the weight of the previous values $f_j$ and vice versa. The value of the forgetting-factor affects the performance of the speech recognition carried out at the back-end and can be varied to optimise the noise robustness of speech recognition.

An initial value of m for a certain sub-band is obtained by calculating a mean value for the sub-band over a predefined number of first consecutive frames. In this embodiment, the initial mean value is calculated using the 38 first frames. In an alternative embodiment, the initial value of m is set equal to the value of a certain sub-band in the first frame, or the initial value of m is a predetermined value, In other alternative embodiments, the number of frames used for calculation of the initial mean estimate can be other than 38.

In this embodiment, word "mean" refers to an arithmetic average, but other forms of averaging (for example logarithmic averaging, geometric averaging, or median, mode or norm values) can be employed.

A further embodiment of the invention comprises a differentiation block DIF to calculate first time derivatives and second time derivatives for each sub-band value.

13 cepstral coefficients are calculated from the output of the mean emphasising block ME:

$$C_i = \sum_{j=1}^{23} f_j \cdot \cos\left(\frac{\pi \cdot i}{23}(j-0.5)\right) \; 0 \le i \le 12. \quad (12)$$

Feature vectors are formed, comprising the 13 cepstral coefficients. In an embodiment of the invention, the feature vector additionally comprises a log-energy coefficient as a fourteenth coefficient. The log-energy coefficient is an energy measure describing the overall energy of a digitised frame of the speech signal. The logarithmic frame energy measure logE is calculated as follows:

$$\log E = \ln\left(\sum_{i=1}^{N} s_{of}(i)^2\right), \quad (13)$$

where N is the frame length in samples and $s_{of}$ is the substantially offset-free input signal.

In a distributed speech recognition system, the final feature vector is further channel encoded prior to its transmission over a communications link to the back end where speech recognition is performed.

Figure 4:
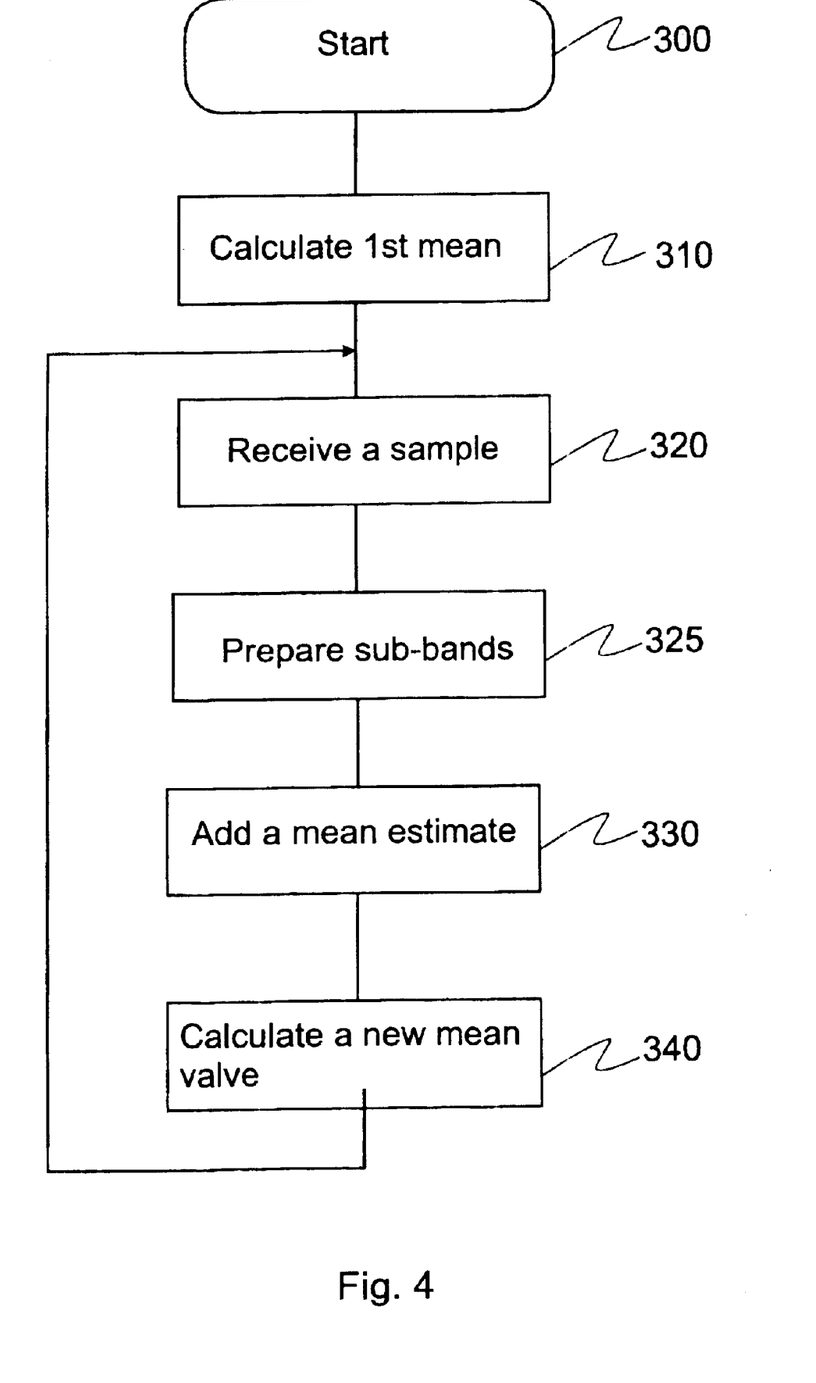
FIG. 4 shows a flow chart of a mean emphasising operation according to the preferred embodiment of the invention.

FIG. 4 shows a flow chart describing the operation of a mean emphasising block operation according to the preferred embodiment of the invention. The operation starts at step 300, when the first speech frames are captured by the front-end. In step 310, the initial mean value is a mean value of a certain sub-band in a predefined number of first consecutive frames. In this embodiment, the initial mean value is calculated using the 38 first frames. During normal operation, that is after the initial start-up phase, one sample is received at a time in step 320 and the mean estimate is updated. The number of samples used to form the mean estimate remains constant (for example, 38) by removing the earliest sample and adding the latest sample. The mean estimate term is added to the sample in step 330. A new mean estimate term value is then calculated in block 340, according to equations (10) and (11). Mean emphasising can improve speech recognition accuracy, when normalisation of speech features is employed.

Figure 5:
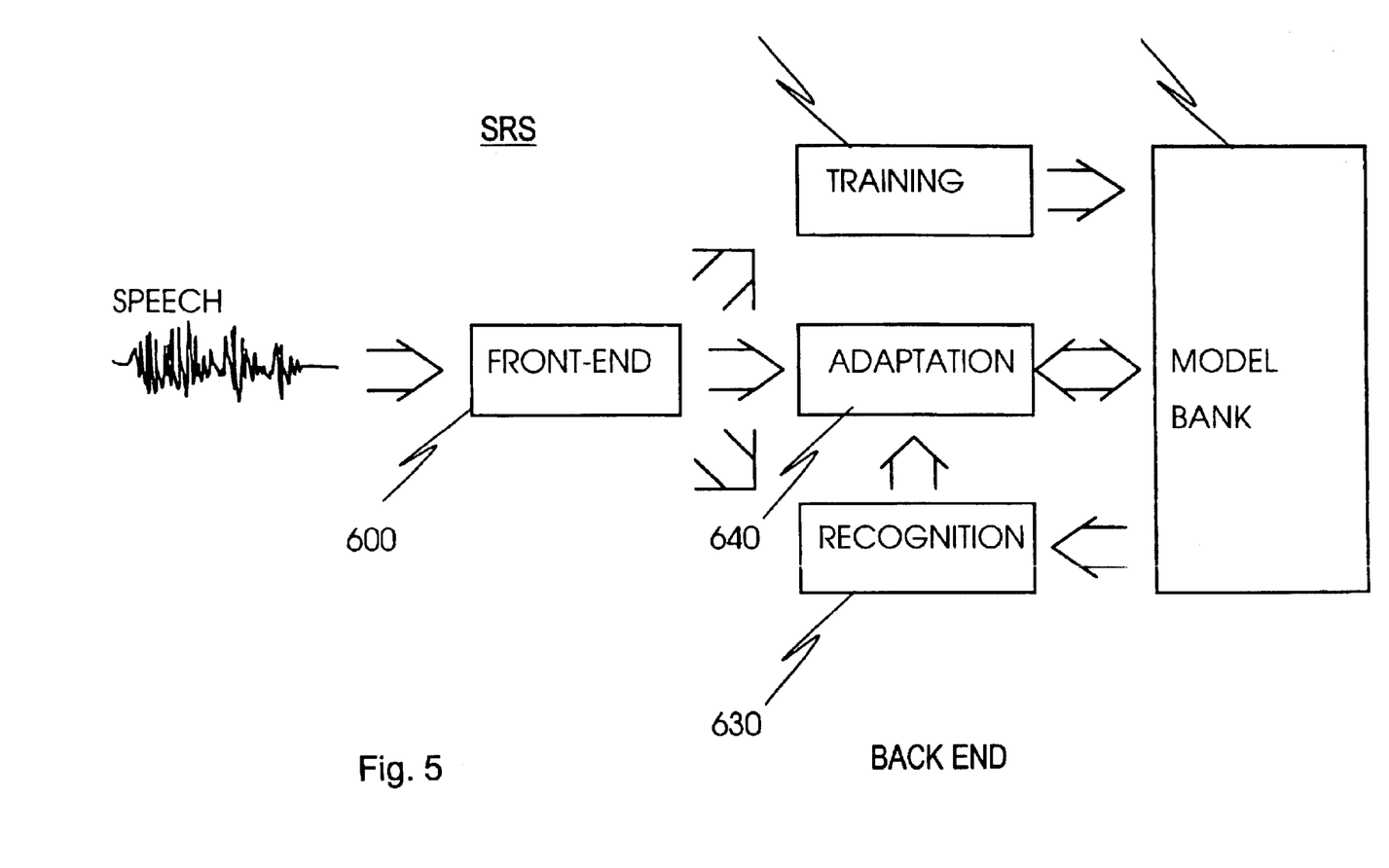
FIG. 5 shows a functional block diagram of a speech recognition system according to the preferred embodiment of the invention.

FIG. 5 shows a functional block diagram of a speech recognition system SRS according to the preferred embodiment of the invention. The system can be divided into five main modules: front-end block 200, training block 610, model bank 620, recognition block 630 and model adaptation block 640. First, a speech signal is processed by the front-end, which converts the signal into feature vectors. These feature vectors are then fed into the training, recognition or adaptation modules.

In a speech recognition system, training is a process that is usually performed in an initial set-up phase. During training, special training data, for example selected words, are applied to the speech recognition system in order to construct statistical models for later use in the recognition of general (i.e. unknown) spoken information. According to the preferred embodiment of the invention, training takes place in the training module 610, where a statistical model called a Hidden Markov Model (HMM) is constructed for each word to be stored. Training can be performed, for example, using input feature vectors corresponding to a given word derived from spoken utterances of the word in question. The newly trained HMM is then added to a model bank 620, which contains all trained models.

When used in the recognition of unknown spoken information, input feature vectors are compared in recognition module 630 with the HMMs in the model bank 620 and the best matching HMM is selected. After recognition and result verification, the correct HMM can be updated in the adaptation module 640. This can be seen as additional training providing continued refinement of the HMM, transparent to the user. In an alternative embodiment the adaptation module is not included in the speech recognition system SRS.

Figure 6:
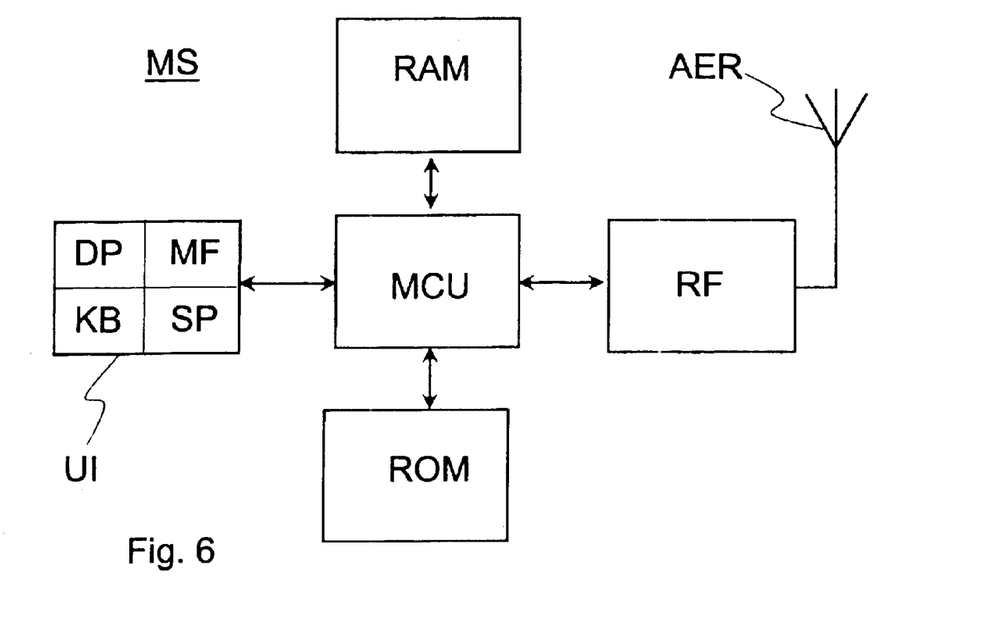
FIG. 6 shows a block diagram of a mobile station according to the preferred embodiment of the invention.

FIG. 6 shows a block diagram of a mobile station MS with a front-end according to the preferred embodiment of the invention. In the mobile station, a Master Control Unit MCU controls blocks responsible for the mobile station's various functions: a Random Access Memory RAM, a Radio Frequency part RF, a Read Only Memory ROM, and a User Interface UI. The user interface comprises a keyboard KB, a display DP, a speaker SP and a microphone MF. The MCU is a microprocessor, or in alternative embodiments, some other kind of processor, for example a Digital Signal Processor. Advantageously, the operating instructions of the MCU have been stored previously in the ROM memory. In accordance with its instructions, the MOU uses the RF block for transmitting and receiving data over a radio path. The MCU uses the RAM as its working memory. The MCU also performs feature extraction according to the method of the invention, when the mobile station is used as a speech-recognition front-end. In the case of a distributed speech recognition system, such as that illustrated in FIG. 5, the MCU causes the RF block to transmit the speech features to a mobile telecommunications network over the radio path for further processing in a remote back-end. In an embodiment of the present invention, the mobile station captures speech with its microphone, extracts features using the MCU, the RAM and the ROM, and then uses the RF block to send the features to the remote back-end. After the remote back-end has carried out speech recognition, and converted the speech into text, the text is transmitted back to the MS over the radio path and received by the RF block. The text may then be displayed on the display. In alternative embodiments, the result of speech recognition can be used for executing a command or dialling a number in response to a spoken command.

Figure 7:
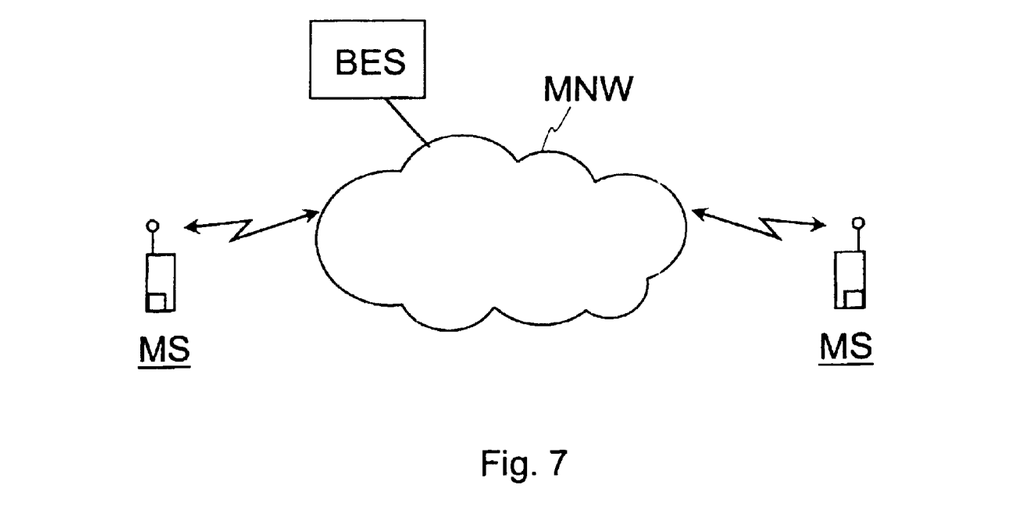
FIG. 7 shows a mobile telecommunications network as an example of the speech recognition system according to the preferred embodiment of the invention.

FIG. 7 shows a mobile telecommunications network MNW as an example of the speech recognition system according to the preferred embodiment of the invention. A back-end server BES is coupled to the MNW. The back-end server performs the BE operations. The back-end server is implemented as a computer with speech recognition software. The mobile network can have a plurality of mobile stations MS connected over plurality of radio paths. In an embodiment of the invention, the back-end server is a network element of the MNW, for example a Mobile Switching Centre MSC. In an alternative embodiment, some or all of the back-end server functionality is implemented using dedicated hardwired logical circuits. In yet another alternative, the back-end server is located in another network such as the Internet so that it is accessible from within the mobile telecommunications network.

Table II shows speech recognition results achieved under certain conditions using a speech recognition system according to the preferred embodiment of the present invention.

TABLE II

Speech recognition accuracy under various types of noise and Signal-to-Noise-Ratio (SNR) achieved with a speech recognition system compared to reference results obtained using a prior art speech recognition system.

| SNR | 1 Noise 1 | 2 Noise 2 | 3 Noise 3 | 4 Noise 4 | 5 Average | Reference |
|---|---|---|---|---|---|---|
| Clean | 99.05 | 98.76 | 98.51 | 99.07 | 98.85 | 98.51 |
| 20 dB | 98.34 | 97.82 | 98.60 | 99.17 | 98.48 | 97.35 |
| 15 dB | 97.42 | 96.28 | 97.85 | 98.67 | 97.56 | 96.16 |
| 10 dB | 94.69 | 91.65 | 96.12 | 98.40 | 95.22 | 92.75 |
| 5 dB | 86.61 | 79.59 | 90.46 | 96.64 | 88.33 | 83.16 |
| 0 dB | 66.10 | 56.09 | 72.47 | 90.62 | 71.32 | 58.39 |
| −5 dB | 29.90 | 31.60 | 38.35 | 70.75 | 42.65 | 32.04 |

The numbers presented in Table II represent the percentage of correctly recognised words under various circumstances, including different types of noise and different signal-to-noise levels. As can be easily determined from the results, for example, by comparing the figures in the columns labelled 1–5 with those in the reference column, the proportion of miss-recognised words compared to correctly recognised words decreases significantly with respect to reference level when the speech recognition method according to the invention is used, particularly at lower signal to noise ratios.

This document presents the implementation and embodiments of the invention with the aid of examples. It is obvious to a person skilled in the art, that the invention is not restricted to details of the embodiments presented above, and that the invention can be implemented in other embodiments without deviating from the characteristics of the invention. Thus, the presented embodiments should be considered illustrative, but not restrictive. Hence, the possibilities for implementing and using the invention are only restricted by the enclosed patent claims. Consequently, the various options of implementing the invention as determined by the claims, including equivalent implementations, also belong to the scope of the present invention.

What is claimed is:

1. A speech recognition feature extractor for extracting speech features from a speech signal, comprising:
    a time-to-frequency domain transformer for generating spectral values in the frequency domain from the speech signal;
    a partitioning means for generating a first set of spectral values in the frequency domain and an additional set of spectral values in the frequency domain;
    a first feature generator for generating a first group of speech features using the first set of spectral values;
    an additional feature generator for generating an additional group of speech features using the additional set of spectral values, arranged to operate in parallel with said first feature generator;
    an assembler for assembling an output set of speech features from at least one speech feature from the first group of speech features and at least one speech feature from the additional group of speech features; and
    an anti-aliasing and sampling rate reduction block configured to convert the output set of speech features to a data reduced output set,
    wherein the first and the additional set of spectral values include at least one common spectral value.

2. A speech recognition feature extractor according to claim 1, wherein the first and additional sets of spectral values are selected from a common frequency range.

3. A speech recognition feature extractor according to claim 1, wherein said first set of spectral values corresponds to a full bandwidth to be used for speech-recognition.

4. A speech recognition feature extractor according to claim 1, wherein said additional set of spectral values is a subset of said first set of spectral values.

5. A speech recognition feature extractor according to claim 1, wherein said first feature generator further comprises:
    a time-to-frequency domain transformer for transforming time-domain speech frames into frequency domain spectral values;
    a frequency domain filtering block for generating sub-band values from the spectral values;
    a compression block for compressing the sub-band values by applying compression to each sub-band value; and
    a transform block for obtaining a set of de-correlated feature coefficients from the sub-band values.

6. A speech recognition feature extractor according to claim 5, wherein said additional feature generator comprises a block for adding a mean estimate term to said sub-band values, whereby the processing block for adding the mean estimate term either precedes or follows the compression of sub-band values.

7. A speech recognition feature extractor according to claim 6, wherein said mean estimate term is calculated from compressed spectral values representing a series of at least two consecutive speech frames.

8. A speech recognition feature extractor according to claim 5, wherein said first feature generator comprises a processing block for adding a mean estimate term to said sub-band values, whereby the processing block for adding the mean estimate term either precedes or follows the compression of sub-band values.

9. A speech recognition feature extractor according to claim 1, wherein said additional feature generator comprises the following blocks:
    a frequency domain filtering block for generating sub-band values;

a compression block for compressing the sub-band values; and a transform block for obtaining a set of de-correlated feature coefficients from the sub-band values.

10. A speech recognition feature extractor according to claim 9, wherein at least one of said first feature generator and additional feature generator further comprises a differentiation block for generating first derivatives and second derivatives for each of said de-correlated feature coefficients.

11. A speech recognition feature extractor according to claim 10, wherein at least one of said first feature generator and additional feature generator further comprises a normalising block for generating normalised speech features from the decorrelated feature coefficients, first time derivatives and second time derivatives.

12. A speech recognition feature extractor according to claim 1, wherein said feature extractor comprises a set of additional feature generators to receive additional sets of spectral values in the frequency domain for generating additional groups of speech features, wherein each of said feature generators is arranged to receive a subpart of said spectral values for generating an additional groups of speech features, and each additional set of spectral values forms one subpart of said spectral values.

13. A speech recognition feature extractor according to claim 12, wherein each subpart differs from the other subparts by at least one spectral value.

14. A speech recognition feature extractor according to claim 12, wherein each of said subparts comprises a different number of spectral values.

15. A speech recognition feature extractor according to claim 12, wherein at least two of the subparts overlap partially.

16. A speech recognition system comprising:
    a speech recognition feature extractor for extracting speech features from a speech signal; and
    a back-end for recognising spoken information from speech features;
    said speech recognition feature extractor including:
        a time-to-frequency domain transformer for generating spectral values in the frequency domain from the speech signal;
        a partitioning means for generating a first set of spectral values in the frequency domain and an additional set of spectral values in the frequency domain;
        a first feature generator for generating a first group of speech features using the first set of spectral values;
        an additional feature generator for generating an additional group of speech features using the additional set of spectral values, arranged to operate in parallel with said first feature generator;
        an assembler for assembling an output set of speech features from at least one speech feature from the first group of speech features of spectral values and at least one speech feature from the additional group of speech features; and
        a anti-aliasing and sampling rate reduction block configured to convert the output set of speech features to a data reduced output set,
    said back-end including:
        a data bank for maintaining statistical models of spoken information;
        a block for receiving speech features from the data reduced output set relating to two different frequency ranges of a speech frame; and
        a recognition block for selecting from the data bank a model of spoken information that best matches with received speech features,
    wherein the first and the additional set of spectral values include at least one common spectral value.

17. A speech recognition feature extraction method for extracting speech features from a speech signal, comprising the steps of:
    generating spectral values in the frequency domain from a speech signal;
    generating a first group of speech features using a first set of spectral values in the frequency domain;
    generating an additional group of speech features using an additional set of spectral values in the frequency domain in parallel with said generation of the first group of speech features;
    assembling an output set of speech features from at least one speech feature from the first group of speech features and at least one speech feature from the additional group of speech features; and
    producing a data reduced output set of speech features by anti-aliasing and reducing sampling rate of the output set of speech features,
    wherein the first and the additional set of spectral values include at least one common spectral value.

18. A method for recognising spoken information from a speech signal, comprising the steps of:
    generating spectral values in the frequency domain from the speech signal;
    generating a first set of spectral values in the frequency domain and an additional set of spectral values in the frequency domain;
    generating a first group of speech features using the first set of spectral values;
    generating an additional group of speech features using the additional set of spectral values in parallel with said generation of the first group of speech features; and
    assembling an output set of speech features from at least one speech feature from the first group of speech features and at least one speech feature from the additional group of speech features;
    producing a data reduced output set of speech features by anti-aliasing and reducing sampling rate of the output set of speech features
    the first and additional set of spectral values being overlapping so that at least one of the spectral values is comprised by both the first set of spectral values and the additional set of spectral values;
    maintaining statistical models of spoken information; and
    selecting a model of spoken information that best matches with the speech features of the data reduced output set of speech features.

19. A computer program product for extracting speech features from a speech signal, comprising:
    a computer readable computer code for causing a computer to generate spectral values in the frequency domain from the speech signal;
    a computer readable computer code for causing a computer to generate a first set of spectral values in the frequency domain and an additional set of spectral values in the frequency domain;
    a computer readable computer code for causing a computer to generate a first group of speech features using the first set of spectral values;

a computer readable computer code for causing a computer to generate an additional group of speech features using the additional set of spectral values in parallel with said generation of the first group of speech features;

a computer readable computer code for causing a computer to assemble an output set of speech features from at least one speech feature from the first group of speech features and at least one speech feature from the additional group of speech features; and a computer readable computer code for causing a computer to produce a data reduced output set of speech features by anti-aliasing and reducing sampling rate of the output set of speech features, wherein the first and the additional set of spectral values include at least one common spectral value.

20. A computer program product for recognising spoken information from a speech signal, comprising:

a computer readable computer code for causing a computer to generate spectral values in the frequency domain from the speech signal;

a computer readable computer code for causing a computer to generate a first set of spectral values in the frequency domain and an additional set of spectral values in the frequency domain;

a computer readable computer code for causing a computer to generate a first group of speech features using the first set of spectral values;

a computer readable computer code for causing a computer to generate an additional group of speech features using the additional set of spectral values in parallel with said generation of the first group of speech features;

a computer readable computer code for causing a computer to assemble an output set of speech features from at least one speech feature from the first group of speech features and at least one speech feature from the additional group of speech features;

a computer readable computer code for causing a computer to produce a data reduced output set of speech features by anti-aliasing and reducing sampling rate of the output set of speech features;

a computer readable computer code for causing a computer to maintain statistical models of spoken information; and a computer readable computer code for causing a computer to select a model of spoken information that best matches with the speech features of the data reduced output set of speech features, wherein the first and the additional set of spectral values include at least one common spectral value.

* * * * *